United States Patent
Klausler

(10) Patent No.: US 8,441,933 B2
(45) Date of Patent: *May 14, 2013

(54) DEADLOCK PREVENTION IN DIRECT NETWORKS OF ARBITRARY TOPOLOGY

(75) Inventor: Peter Michael Klausler, Middleton, WI (US)

(73) Assignee: Google, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,722

(22) Filed: Feb. 6, 2012

(65) Prior Publication Data

US 2012/0140631 A1    Jun. 7, 2012

Related U.S. Application Data

(63) Continuation of application No. 12/643,280, filed on Dec. 21, 2009, now Pat. No. 8,139,490.

(51) Int. Cl.
*H04L 1/00* (2006.01)
*H04L 12/26* (2006.01)
*H04L 12/28* (2006.01)
*H04L 12/56* (2006.01)

(52) U.S. Cl.
USPC .......................................... 370/235; 370/392

(58) Field of Classification Search .................. 370/235, 370/237, 238, 389, 392
See application file for complete search history.

(56) References Cited

U.S. PATENT DOCUMENTS

| | | | |
|---|---|---|---|
| 7,773,618 B2 | 8/2010 | Leonard et al. | |
| 2002/0159453 A1 | 10/2002 | Foster et al. | |
| 2008/0107106 A1 | 5/2008 | Leonard et al. | |
| 2009/0063891 A1 | 3/2009 | Arimilli et al. | |
| 2009/0106529 A1 | 4/2009 | Abts et al. | |
| 2010/0097986 A1 | 4/2010 | Ylitalo et al. | |

OTHER PUBLICATIONS

CH14, Deaflock and livelock, http://syslab.cs.nchu.edu.tw/2005springPDF/, retrieved from the Internet Oct. 22, 2009, pp. 50.
Kim et al., "Flattened Butterfly: A Cost-Efficient Topology for High-Radix Networks," ISCA, 2007, pp. 12.
Gelernter, "A DAG-Based Algorithm for Prevention of Store-and-Forward Deadlock in Packet Networks," IEEE Transactions on Computers, vol. C-30. No. 10, Oct. 1991, pp. 7.
Hilbrich et al., "A Graph Based Approach for MPI Deadlock Detection," ACM, Jun. 2009, pp. 10.

(Continued)

*Primary Examiner* — Ronald Abelson
(74) *Attorney, Agent, or Firm* — Lerner, David, Littenberg, Krumholz & Mentlik, LLP

(57) ABSTRACT

Aspects of the invention pertain to routing packets in a computer system while avoiding deadlock. A turn rule is set according to unique identifiers associated with switches in the system. Numeric values of switches in possible turns are compared to determine whether a turn is permissible. The rule applies to all nodes in the system. The rule may be violated when using virtual channels. Here, a violation is permissible when using monotonically increasing virtual channel numbers or monotonically decreasing virtual channel numbers. Alternatively, the violations of the turn rule may be allowed if they force a packet to change to a later virtual channel in some fixed ordering of virtual channels. Deadlock can thus be avoided in many different types of architectures, including mesh, torus, butterfly and flattened butterfly configurations.

22 Claims, 6 Drawing Sheets

OTHER PUBLICATIONS

Glass et al., "The Turn Model For Adaptive Routing," Tech Rep., MSU-CPS-ACS-44, Accepted to appear in Proceedings of the 19th Annual International Symposium on Computer Architecture, May 1992, Mar. 2, 1992, pp. 24.

Kim et al., "Polymorphic On-Chip Networks," IEEE, Downloaded from the Internet on May 19, 2009, pp. 101-112.

Mellanox InfiniScale® IV, 2008, downloaded from the Internet Dec. 2009, 2 pages.

Kim et al, "Flattened Butterfly Tolpology for On-Chip Networks," IEEE/ACM International Symposium on Microarchitecture, 2007, Downloaded from the Internet May 19, 2009, pp. 172-182.

Savage, "Flattened Butterfly Network Lets Data Fly Through Supercomputers and Mutlitcore Processors," IEEE Spectrum, Jul. 16, 2008, 2 pages.

International Search Report and Written Opinion, PCT/US2010/061467, dated Aug. 29, 2011.

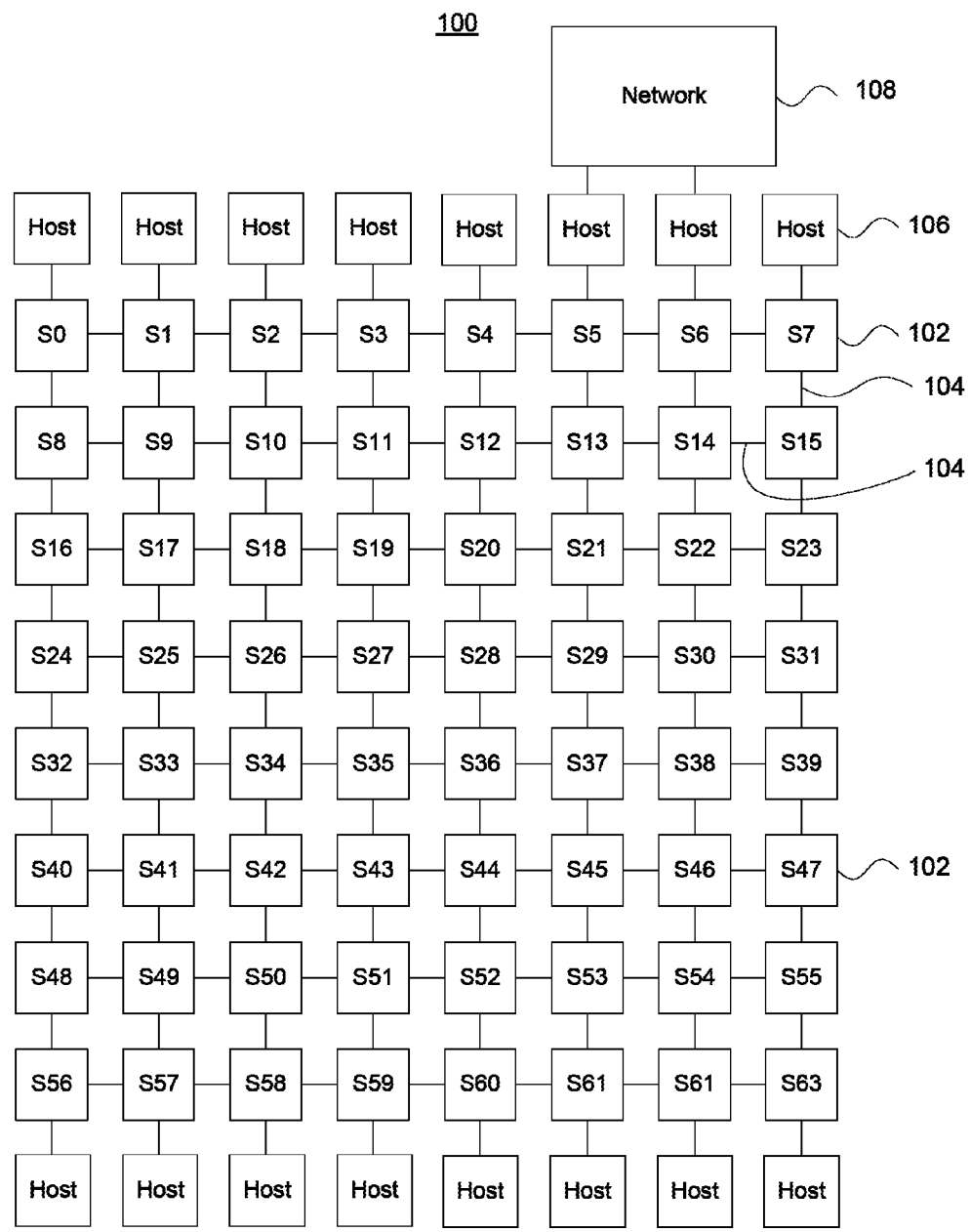

DEADLOCK PREVENTION IN DIRECT NETWORKS OF ARBITRARY TOPOLOGY

CROSS-REFERENCE TO RELATED APPLICATIONS

The present application is a continuation, of U.S. patent application Ser. No. 12/643,280, filed Dec. 21, 2009, the disclosure of which is incorporated herein by reference.

BACKGROUND OF THE INVENTION

1. Field of the Invention

Aspects of the invention relate generally to routing data in computer networks. More particularly, aspects are directed to deadlock prevention in computer networks regardless of system configuration.

2. Description of Related Art

In many communication networks, multiple processors are often employed. The processors may be arranged in different configurations. For instance, an array of processors may be configured in a mesh or torus architecture. The array may also be interconnected to other arrays in different networks.

Various routing schemes, including flow control, have been employed to pass data between components within such communication networks. However, some communication networks use flow control mechanisms that can stall traffic on a link into a switch of a node until buffer space or other resources become available. Blockage on an output link of a network node may propagate backwards across the switch and stall its input links that are trying to route the stalled output.

A condition known as "deadlock" can arise in which a stalled link is indirectly dependent upon itself. Deadlock is a serious condition causing loss of data errors and which may require a network restart to correct. Previously, different techniques have been employed to combat deadlock. Unfortunately, such techniques may fail in different situations.

For instance, a "turn model" may require specific restrictions for each type of network topology. The turn model may fail when the network is missing a link or switch and no longer provides a complete topology. In "up*/down*" routing, an arbitrary network is covered by a spanning tree. Routes are constrained to flow in certain directions; however this may lead to link load imbalance near the root of the spanning tree and may also require a network restart when a link or switch goes down. In "folded Clos" or "fat tree" type networks, deadlock is addressed by imposing route restrictions that may be unduly limiting.

SUMMARY OF THE INVENTION

Systems and methods which incorporate blocking flow control to prevent deadlock are provided. Such systems and methods function are designed to function even when a network or routes within the network are changed.

In one embodiment, a method of routing packets in a computer network to avoid deadlock is provided. The method includes assigning a distinct identifier to each switch in the computer network. The distinct identifier is unique to each respective switch. The method also includes setting a turn rule for routing packets across the computer network so that deadlock is avoided. The turn rule prohibiting sending packets from a first switch (A) to a second switch (C) via an intermediate switch (B) given a selected condition. The condition is selected from the group consisting of the distinct identifier of intermediate switch B has a value greater than the values of the distinct identifiers of both first switch A and second switch C, or the distinct identifier of intermediate switch B has a value less than the values of the distinct identifiers of both first switch A and second switch C. The method further includes providing the turn rule to each switch in the computer network, and routing the packets across the computer network according to the turn rule. The selected condition is maintained for subsequent packet routing.

In one example, the first switch A, second switch C and intermediate switch B are configured for adaptive routing. In another example, first switch A, second switch C and intermediate switch B each maintain multiple routing tables. In a further example, the distinct identifier of each switch is a hash of a hardware identifier.

In one alternative, the method further comprises supporting a plurality of virtual channels in each switch; determining whether the turn rule would be violated given the selected condition; setting a virtual channel rule that permits violation of the turn rule by selecting a unique ordering of the plurality of virtual channels; and routing the packets across the computer network according to the virtual channel rule, wherein the virtual channel rule is maintained for subsequent packet routing.

In another alternative, the method further comprises supporting a plurality of virtual channels in each switch, determining whether the turn rule would be violated given the selected condition, and setting a virtual channel rule that permits violation of the turn rule if one and only one of the following conditions occurs: monotonically increasing a virtual channel number from a first channel number to a higher channel number, or monotonically decreasing the virtual channel number from the first channel number to a lower channel number. In this alternative, the method also includes routing the packets across the computer network according to the virtual channel rule. The virtual channel rule is maintained for subsequent packet routing.

In another example, the computer network is a butterfly network architecture. In a further example, the computer network comprises a chip multiprocessor architecture and each switch is coupled to an associated processor.

In accordance with another embodiment, a computer-readable recording medium is provided. The recording medium has instructions stored thereon. The instructions, when executed by a processor, cause the processor to perform the operations of assigning a distinct identifier to each switch in a computer network, the distinct identifier being unique to each respective switch; setting a turn rule for routing packets across the computer network so that deadlock is avoided, the turn rule prohibiting sending packets from a first switch (A) to a second switch (C) via an intermediate switch (B) given a selected condition, the condition being selected from the group consisting of: the distinct identifier of intermediate switch B has a value greater than the values of the distinct identifiers of both first switch A and second switch C, or the distinct identifier of intermediate switch B has a value less than the values of the distinct identifiers of both first switch A and second switch C; providing the turn rule to each switch in the computer network; and routing the packets across the computer network according to the turn rule, wherein the selected condition is maintained for subsequent packet routing.

In one example, the operations further comprise determining whether the turn rule would be violated given the selected condition; setting a virtual channel rule that permits violation of the turn rule by selecting a unique ordering of the plurality of virtual channels; and routing the packets across the computer network according to the virtual channel rule, wherein the virtual channel rule is maintained for subsequent packet routing.

In another example, the operations further comprise determining whether the turn rule would be violated given the selected condition; setting a virtual channel rule that permits violation of the turn rule if one and only one of the following conditions occurs: monotonically increasing a virtual channel number from a first channel number to a higher channel number, or monotonically decreasing the virtual channel number from the first channel number to a lower channel number; and routing the packets across the computer network according to the virtual channel rule, wherein the virtual channel rule is maintained for subsequent packet routing.

In a further embodiment, a computer system, comprises a plurality of switching elements that are disposed at respective nodes in the computer system. Each switching element is identified by a distinct identifier. Adjacent switching elements are directly connected to one another. Each switching element implements a turn rule for routing packets so that deadlock is avoided in the computer system. The turn rule prohibits sending packets from a first switching element (A) to a second switching element (C) via an intermediate switching element (B) given a selected condition. The condition is selected from the group consisting of: the distinct identifier of intermediate switching element B has a value greater than the values of the distinct identifiers of both first switching element A and second switching element C, or the distinct identifier of intermediate switching element B has a value less than the values of the distinct identifiers of both first switching element A and second switching element C.

In one example, the first switching element A, second switching element C and intermediate switching element B are configured for adaptive routing. In another example, the first switching element A, second switching element C and intermediate switching element B each store multiple routing tables. In a further example, the distinct identifier of each switching element is a hash of a hardware identifier of that respective switching element.

In an alternative, switching elements A, B and C each support a plurality of virtual channels and employ a virtual channel rule permitting violation of the turn rule by following a preselected unique ordering of the plurality of virtual channels.

In another alternative, switching elements A, B and C each support a plurality of virtual channels and employ a virtual channel rule permitting violation of the turn rule if one and only one of the following conditions occurs: monotonically increasing a virtual channel number from a first channel number to a higher channel number, or monotonically decreasing the virtual channel number from the first channel number to a lower channel number.

In yet another example, the computer system has a butterfly network architecture. In a further example, the computer system has a mesh network architecture.

In an alternative, the computer system comprises a chip multiprocessor architecture and each switching element is coupled to an associated processor. And in yet another alternative, the plurality of switching elements comprise routers in the nodes of a computer network. At least some of the routers are connected to hosts for transmitting data packets across the network.

BRIEF DESCRIPTION OF THE DRAWINGS

FIG. 1 illustrates a multiprocessor architecture for use in accordance with aspects of the invention.

DETAILED DESCRIPTION

Figure 2A:
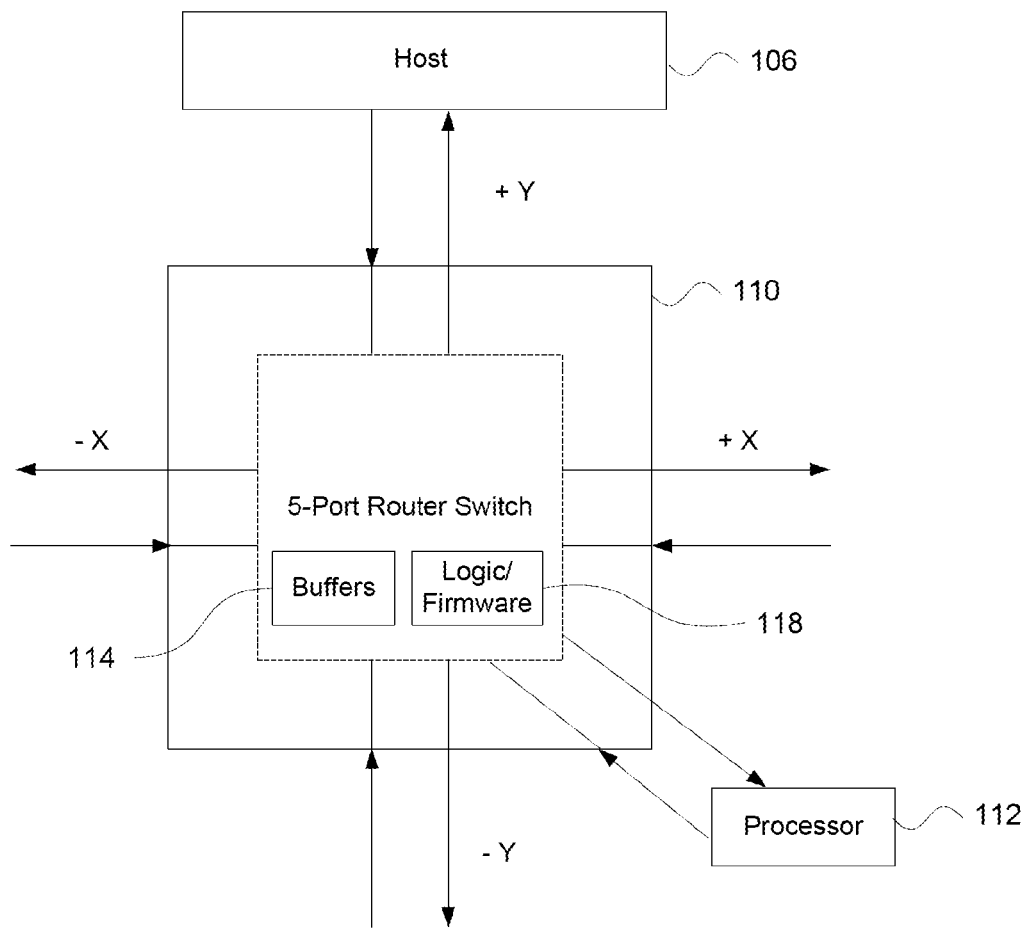
FIGS. 2A-B illustrate a router switch in accordance with aspects of the invention.

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

FIG. 1 illustrates an exemplary computer network architecture 100 for use with aspects of the invention. As shown, the architecture includes a number of switches (S0 ... S63) at nodes 102 arranged in a mesh-type configuration. The switches S at adjacent nodes 102 in the X and Y directions of the mesh are connected to one another via connections/links 104. For instance, switch S9 is connected to switches S1, S8, S10 and S17. While a mesh configuration is illustrated, any other architecture may be employed, including torus, butterfly, flattened butterfly and the like.

In the example of FIG. 1, switches along the top (S0 ... S7) and bottom (S56 ... S63) nodes or the side nodes of the mesh may be connected to respective hosts 106. Hosts may be, for instance, a processing device or computer system connected to the network via a network interface card. Each host 106 may originate and/or receive traffic from nodes in the network. As shown in this example, one switch S (e.g., S0, S4, S61) connects to each host, although multiple hosts may connect to a single switch S. Other configurations may have multiple switches S connecting to a single host. In addition, certain hosts 106 may couple to another network 108. All such configurations may be used in accordance with the invention as set forth herein.

FIG. 2A illustrates an example where a given node 102 includes a multi-port router switch 110. In the configuration shown, the multi-port router switch 110 is a five-port router switch S. Four ports connect to adjacent nodes in the +X, −X, +Y and −Y directions of the mesh. The fifth port desirably connects to a processor 112 (e.g., a host) co-located at the switch's respective node. In this example, the switch 110 is switch S4 of FIG. 1. Thus, the −X direction port connects to switch S3, the +X direction port connects to switch S5 and the −Y direction port connects to switch S12. As switch S4 is located along a top edge of the mesh, its port in the +Y direction connects to a host 106. While a five-port router switch is shown, other types of multi-port switches may be employed using any number of ports. By way of example, the Mellanox InfiniScale® IV 36 port switch device may be used. This switch device may be employed in a multidimensional 6-ary, 6-flat network topology. The switches used may be of different types or configurations.

Figure 2B:
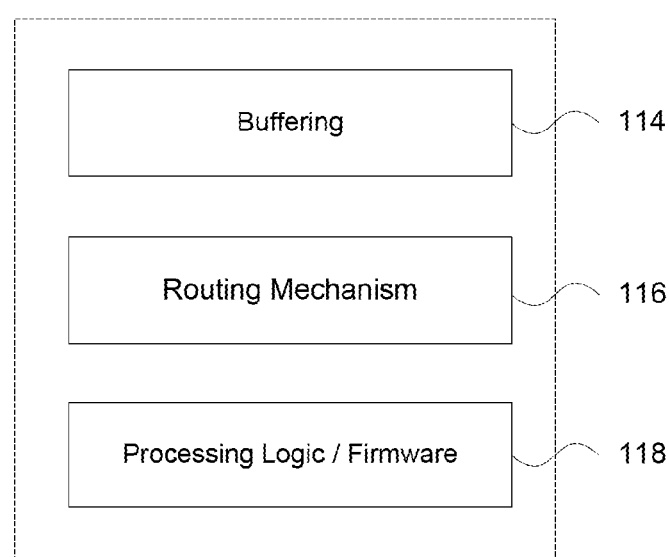

Turning to FIG. 2B, this figure shows that the multi-port router switch 110 may include buffering 114 and a routing mechanism 116 for routing data packets to other nodes in the network. The router switch 110 may also include processing logic or firmware ("logic") 118 for determining which next switch to route packets along.

In accordance with one aspect of the invention, each switch S preferably includes the following features. First, the switch S should have a high port count to properly enable routing in the network. For example, in a flattened butterfly network, there should be at least 28 ports per switch S. Other types of networks may employ less or more ports per switch or per dimension. Another feature is that the switch S should have adaptive routing capabilities. Preferably, the switch S should be able to have multiple routing tables in the switch. In this situation, not all ports are routed by a single routing table, enabling the switch to employ port specific routing.

Figure 3:
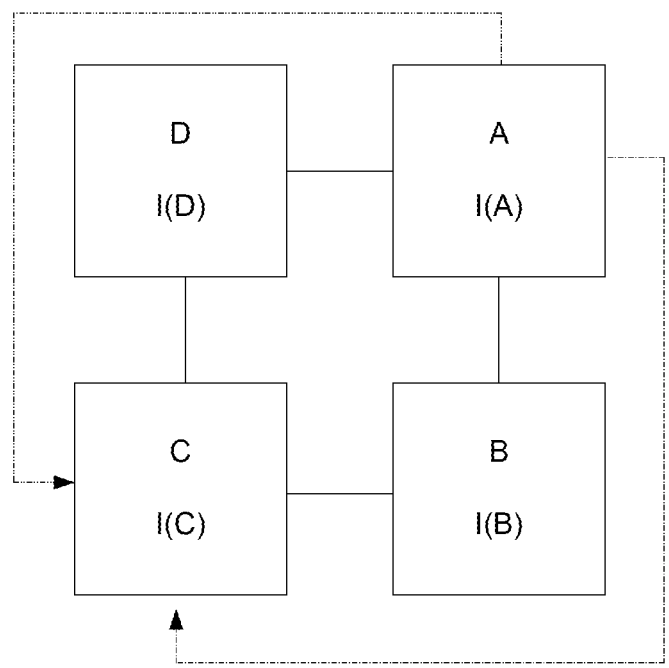
FIG. 3 illustrates a routing scenario in accordance with aspects of the invention.

FIG. 3 illustrates a routing example in accordance with aspects of the invention. Four router switches A, B, C and D are provided. One "turn" (A,B,C) through switch B comprises a pair of hops (A,B) and (B,C), moving a packet of data from A to C via B.

Each switch "X" is preferably assigned a permanent and distinct identifier "I(X)." The identifiers for the switches A, B, C and D are, respectively, I(A), I(B), I(C) and I(D). An identifier may be assigned by the network, for instance randomly or using a permanent hardware identity. Thus, in the case where the switch has an InfiniBand Globally Unique Identifier ("GUID") or other unique identifier, that identifier or a hash thereof may serve as the distinct identifier.

In a real-world example, not all switches S or links 104 are always "up" or active. Generally speaking, there is usually at least one fault under repair. And new switches may be added to the network on an ad-hoc basis. Thus, in order to ensure consistency, the distinct identifier for each switch S preferably does not change over time.

For the example of FIG. 3, there are four possible options for the distinct identifiers, namely:

$I(A)<I(B)<I(C)$
$I(A)<I(B)>I(C)$
$I(A)>I(B)<I(C)$
$I(A)>I(B)>I(C)$

A "flow dependence" exists when packet flow on a specific (virtual) channel depends on the ability of packets to flow on another channel. Flow on a channel into a switch is dependent on flow on a channel out of a switch if that switch is capable of routing traffic from the input channel to the output. This dependence relationship between virtual channels can lead to deadlock if any channel depends, directly or transitively, upon itself.

To avoid such problems, in one aspect routes across switches are determined according to the following rule. Any turn "A to B to C" from switch A across switch B to switch C may be used in a route unless it is the case where $I(A)<I(B)$ and $I(C)<I(B)$. The permanence of the identifiers I(X) guarantees safety from deadlocks even as switches and links come and go from the network and new routes are computed. In this scenario, deadlocks cannot arise even between old traffic and new traffic after a re-routing event because the comprehensive set of turns in all routes never contains a turn $I(A)<I(B)>I(C)$.

Consider the example where A=4, B=5, C=2 and D=3. In the present embodiment, a packet is routed from A to C. Using the above rule, the packet cannot be routed through switch B, because $4_{(A)}<5_{(B)}>2_{(C)}$. However, the packet can be routed through switch D, because $4_{(A)}>3_{(B)}>2_{(C)}$. Thus, a turn (A,D,C) would be selected.

Alternatively, in another embodiment all turn combinations $I(A)>I(B)<I(C)$ could be prohibited with the same effect as above, specifically guaranteed safety from deadlocks. In this case, turn (A,B,C) would be selected because unlike (A,D,C) it would not conflict with the prohibited relation. In the scenario, adjacent switches (e.g., A and B, B and C, A and D, or C and D) are directly connected to one another without any intervening switches.

The logic for performing adaptive routing may reside in the switches S at each respective node, such as in processing logic or firmware 116 of FIG. 2B. The routing logic is desirably integral to every switch S in the network. Each switch may determine which output port to employ using either a routing table or equivalent logic. A routing table provides flexibility and handles faults gracefully by easily re-routing packets. A "routing algorithm" is desirably implemented by programming the collective set of routing tables. Preferably, each switch S is configured to employ multiple routing tables to enable port specific routing. As changes to the network occur, the switches may recomputed some or all routes through the network.

Adaptive routing in accordance with an aspect of the invention maps local destinations to sets of ports. The switch managing a data packet may select which switch it will send the packet to. Preset packets sent from selected hosts may be employed to discover the network topology. Desirably, each switch S maintains a table with entries for every host in the network and distances to each host. The distance is determined by the number of hops (e.g., intervening switches/nodes) from the switch via intervening nodes to the host. A given switch may iterate on distance to compute hosts X hops away from itself. This may be done by evaluating neighboring switches. In one aspect, this distance determination is done while adhering to the rule set forth above, namely avoid turns where $I(A)<I(B)>I(C)$, or where $I(A)>I(B)<I(C)$.

Figure 4:
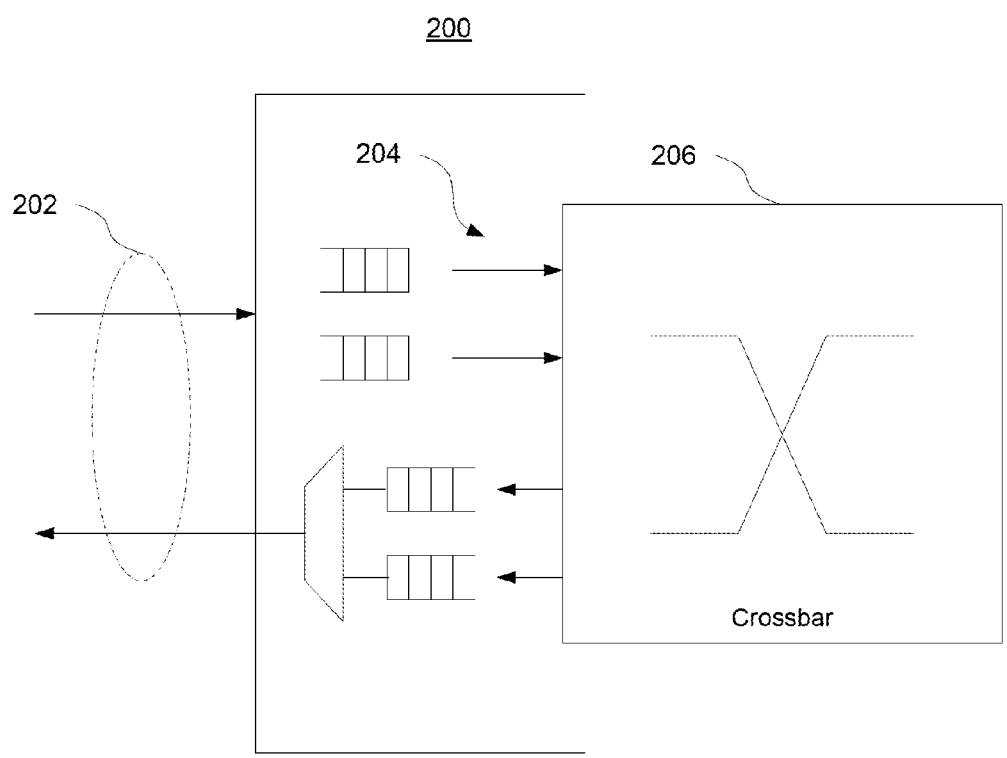
FIG. 4 illustrates virtual channels for use with aspects of the invention.

Virtual channels may used to break deadlock in accordance with aspects of the invention by providing alternative routes between nodes in the network. Virtual channels may be employed in various networks to route data packets among nodes in the network. FIG. 4 illustrates an exemplary virtual channel configuration 200 for the routing mechanism 114 of the router switch 110 of FIGS. 2A-B. As shown in FIG. 4, there is at least one pair of shared physical channels 202 into and out of the switch. A set of independent request and response virtual channels 204 may be multiplexed between the shared physical channels 202 and a crossbar architecture 206.

According to one aspect, the aforementioned turn rule may be violated using virtual channels. Specifically, turn combinations of $I(A)<I(B)>I(C)$—or $I(A)>I(B)<I(C)$—are only allowed if that turn can be accompanied by a permanent transition to a higher (or lower) virtual network. In other words, networks with multiple virtual channels may use an otherwise impermissible turn to signal a point of transition to a higher-numbered (or lower-numbered) virtual channel. This may be accomplished by limiting the transitions to a preselected ordering of virtual channels.

Each switch may include N virtual channels. For example, when N=4, there are four virtual channels per physical link. In other words, there are four buffers for the physical link into which a data packet can be stored. In the present example, each virtual channel has its own distinct rank (e.g., 0, 1, 2 or 3). In the case of a flattened butterfly, at least 2 virtual channels should be employed. There are N! (N factorial) different (unique) orderings for the virtual channels. Any of them may be selected. However, once one particular ordering has been selected, it should be followed going forward to avoid deadlock.

In one example, the turn rule may be violated so long as the packet is routed only to monotonically increasing virtual channel numbers. By way of example, assume the present virtual channel=1. Here, if the turn rule would result in no valid paths along virtual channel 1, then a route in violation of the turn rule may be selected using virtual channel 2. Following turns would use virtual channel 2 so long as the turn rule is not violated. Subsequently, if no valid paths are available using virtual channel 2, then a path violating the turn rule may be selected using virtual channel 3.

In an alternative example, the turn rule may be violated so long as the packet is routed only to monotonically decreasing virtual channel numbers. By way of example, assume the present virtual channel=1. Here, if the turn rule would result in no valid paths along virtual channel 1, then a route in violation of the turn rule may be selected using virtual channel 0. Following turns would use virtual channel 0. Thus, the turn rule may be violated using monotonically increasing virtual channel numbers or monotonically decreasing virtual channel numbers. In this situation, only one of these two options may be employed. The network may not vary between the two options without potentially resulting in a deadlock situation.

As noted above, aspects of the invention may be incorporated in different network configurations. In fact, deadlock may be prevented on any network topology in which each switch has a distinct identifier when incorporating aspects of the invention. By way of example, a two-dimensional mesh architecture such as in FIG. 1 or other two-dimensional architecture such as a torus may be in used. Other multidimensional architectures may also be employed, such as butterfly networks and flattened butterfly networks.

In one example, every node in the network is assigned an N-dimensional coordinate. There are N axes in the network. Here, in a mesh-type example, the coordinates differ by 1 in adjacent nodes. In other words, each switch connects to every other switch whose coordinates differ on a single axis. Each hop between switches replaces one coordinate.

Figure 5:
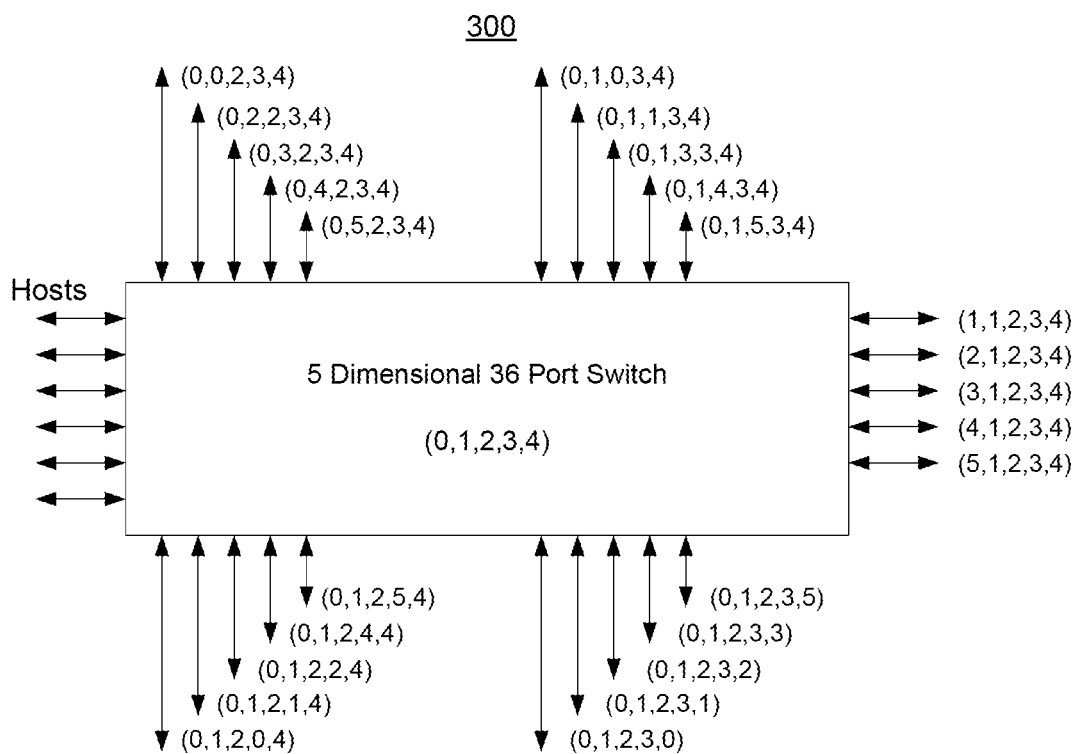
FIG. 5 illustrates a multidimensional switch in accordance with aspects of the invention.

FIG. 5 illustrates a 5 dimensional switch 300. In this example, the switch 300 has 36 bidirectional ports, including 6 ports for hosts. As shown, each link to a neighboring switch differs in a single coordinate.

During operation, the switch 300 may receive an input packet from any of the connected hosts or from any of the other switches connected on remaining ports. In most cases, the number of physically minimal routes between two switches that differ in j digits is j! (j factorial). The number of permissible routes according to the aforementioned turn rule is less, with a lower bound of $(j/2)!^2$.

For example, consider the minimal routes under the turn model in a 4-dimension flattened butterfly between the switches with addresses (1,2,3,4) and (4,3,2,1). The following routes are legal:

(1,2,3,4)->(1,2,2,4)->(1,2,2,1)->(4,2,2,1)->(4,3,2,1)
(1,2,3,4)->(1,2,2,4)->(1,2,2,1)->(1,3,2,1)->(4,3,2,1)
(1,2,3,4)->(1,2,3,1)->(1,2,2,1)->(4,2,2,1)->(4,3,2,1)
(1,2,3,4)->(1,2,3,1)->(1,2,2,1)->(1,3,2,1)->(4,3,2,1)

However, the other twenty possible paths of minimal length contain impermissible turns, such as:

(1,2,3,4)->(4,2,3,4)->(4,3,3,4)->(4,3,2,4)->(4,3,2,1)

As can be observed in this example, all of the legal minimal routes in the same virtual network between some pair of switches must pass through the switch whose coordinates are the minima of the corresponding coordinates of the source and destination endpoint addresses. This is (1,2,2,1) in the example above.

Aspects of the invention may be employed with different types of computer networks. These include distributed systems having hosts and nodes that may be located in numerous physical locations. By way of example, a network may include one or more datacenters coupled together, with hosts comprising different servers within a datacenter or among separate datacenters. The invention may also be employed in multiprocessor computer systems such as chip multiprocessors.

Figure 6:
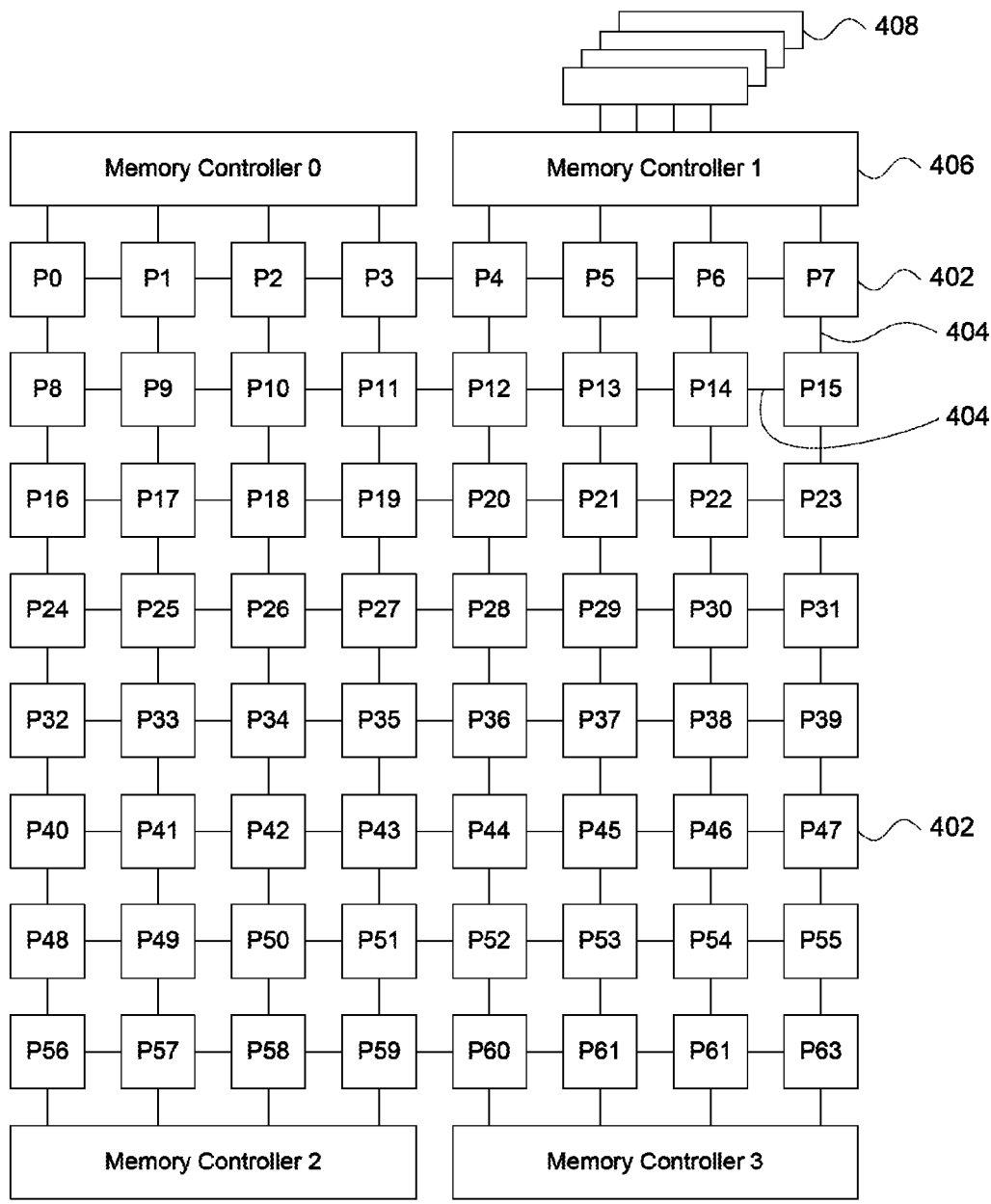
FIG. 6 illustrates a chip multiprocessor for use with aspects of the present invention.

FIG. 6 illustrates an exemplary chip multiprocessor architecture 400 for use with aspects of the invention. As shown, the architecture includes 64 processors (P0 . . . P63) arranged in a mesh-type configuration at nodes 402. The processors at adjacent nodes 402 in the mesh are directly linked to one another via connections 404. For instance, processor P9 is connected to processors P1, P8, P10 and P17. While a mesh architecture is shown, other architectures may be used in accordance with aspects of the invention.

The processors along the top (P0 . . . P7) and bottom (P56 . . . P63) nodes of the mesh may be directly linked to respective memory controllers 406. As shown in this example, four processors 402 connect to each memory controller 106. In addition, each memory controller 406 couples to a physical memory 408. The remaining processors may communicate with the memory controllers 406 through one or more intervening nodes 402.

Packet routing may be accomplished in architecture 400 in the same manner as described above. So long as the turn rule is not violated, namely no turns either when I(A)<I(B)>I(C), or when I(A)>I(B)<I(C), deadlock will be avoided. A chip multiprocessor architecture with multiple virtual channels may also use an otherwise impermissible turn to signal a point of transition to a higher-numbered (or lower-numbered) virtual channel. Here, as above, the turn rule may be violated using either monotonically increasing virtual channel numbers or monotonically decreasing virtual channel numbers.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A method of routing packets in a computer network to avoid deadlock, the method comprising:
   setting a turn rule for routing packets across the computer network, the turn rule prohibiting sending packets from a first switch (A) to a second switch (C) via an intermediate switch (B) given a selected condition, the condition being selected from the group consisting of:
      a distinct identifier of intermediate switch B has a value greater than values of distinct identifiers of both first switch A and second switch C, or
      the distinct identifier of intermediate switch B has a value less than the values of the distinct identifiers of both first switch A and second switch C; and
   providing the turn rule to each of the first switch A, second switch C and intermediate switch B for routing the packets across the computer network according to the turn rule.

2. The method of claim 1, wherein one or more of the first switch A, second switch C and intermediate switch B are configured for adaptive routing.

3. The method of claim 1, wherein one or more of the first switch A, second switch C and intermediate switch B maintain multiple routing tables.

4. The method of claim 1, further comprising assigning the distinct identifier to first switch A, second switch C and intermediate switch B, wherein the distinct identifier of each respective switch is a hash of a hardware identifier.

5. The method of claim 1, wherein the method further comprises:
supporting a plurality of virtual channels in first switch A, second switch C and intermediate switch B;
determining whether the turn rule would be violated given the selected condition;
setting a virtual channel rule that permits violation of the turn rule by selecting a unique ordering of the plurality of virtual channels; and
routing the packets across the computer network according to the virtual channel rule.

6. The method of claim 1, wherein the method further comprises:
supporting a plurality of virtual channels in first switch A, second switch C and intermediate switch B;
determining whether the turn rule would be violated given the selected condition; and
setting a virtual channel rule that permits violation of the turn rule if one and only one of the following conditions occurs:
monotonically increasing a virtual channel number from a first channel number to a higher channel number, or
monotonically decreasing the virtual channel number from the first channel number to a lower channel number.

7. The method of claim 1, wherein the computer network is a butterfly network architecture.

8. The method of claim 1, wherein the computer network comprises a chip multiprocessor architecture and the first switch A, second switch C and intermediate switch B are each coupled to an associated processor.

9. The method of claim 1, wherein the selected condition is maintained for subsequent packet routing.

10. A computer-readable recording medium having instructions stored thereon, the instructions, when executed by a processor, cause the processor to perform the operations of:
setting a turn rule for routing packets across the computer network, the turn rule prohibiting sending packets from a first switch (A) to a second switch (C) via an intermediate switch (B) given a selected condition, the condition being selected from the group consisting of:
a distinct identifier of intermediate switch B has a value greater than values of distinct identifiers of both first switch A and second switch C, or
the distinct identifier of intermediate switch B has a value less than the values of the distinct identifiers of both first switch A and second switch C; and
providing the turn rule to each of the first switch A, second switch C and intermediate switch B for routing the packets across the computer network according to the turn rule.

11. The recording medium of claim 10, wherein the operations further comprise:
determining whether the turn rule would be violated given the selected condition;
setting a virtual channel rule that permits violation of the turn rule by selecting a unique ordering of the plurality of virtual channels; and
routing the packets across the computer network according to the virtual channel rule.

12. The recording medium of claim 10, wherein the operations further comprise:
determining whether the turn rule would be violated given the selected condition; and
setting a virtual channel rule that permits violation of the turn rule if one and only one of the following conditions occurs:
monotonically increasing a virtual channel number from a first channel number to a higher channel number, or
monotonically decreasing the virtual channel number from the first channel number to a lower channel number.

13. A computer system, comprising:
a plurality of switching elements being disposed at respective nodes in the computer system;
each switching element implementing a turn rule for routing packets in the computer system, the turn rule prohibiting sending packets from a first switching element (A) to a second switching element (C) via an intermediate switching element (B) given a selected condition, the condition being selected from the group consisting of:
a distinct identifier of intermediate switching element B has a value greater than values of distinct identifiers of both first switching element A and second switching element C, or
the distinct identifier of intermediate switching element B has a value less than the values of the distinct identifiers of both first switching element A and second switching element C.

14. The computer system of claim 13, wherein one or more of the first switching element A, second switching element C and intermediate switching element B are configured for adaptive routing.

15. The computer system of claim 13, wherein one or more of the first switching element A, second switching element C and intermediate switching element B store multiple routing tables.

16. The computer system of claim 13, wherein the distinct identifier of each switching element is a hash of a hardware identifier of that respective switching element.

17. The computer system of claim 13, wherein switching elements A, B and C each support a plurality of virtual channels and employ a virtual channel rule permitting violation of the turn rule by following a preselected unique ordering of the plurality of virtual channels.

18. The computer system of claim 13, wherein switching elements A, B and C each support a plurality of virtual channels and employ a virtual channel rule permitting violation of the turn rule if one and only one of the following conditions occurs:
monotonically increasing a virtual channel number from a first channel number to a higher channel number, or
monotonically decreasing the virtual channel number from the first channel number to a lower channel number.

19. The computer system of claim 13, wherein the computer system has a butterfly network architecture.

20. The computer system of claim 13, wherein the computer system has a mesh network architecture.

21. The computer system of claim 13, wherein the computer system comprises a chip multiprocessor architecture and switching elements A, B and C are each coupled to an associated processor.

22. The computer system of claim 13, wherein the switching elements A, B and C comprise routers in the nodes of a computer network, at least some of the routers connecting to hosts for transmitting data packets across the network.

* * * * *